US006224782B1

(12) United States Patent
Allewaert et al.

(10) Patent No.: US 6,224,782 B1
(45) Date of Patent: May 1, 2001

(54) FLUOROCHEMICAL COMPOSITION COMPRISING A POLYURETHANE HAVING A FLUOROCHEMICAL OLIGOMER AND A HYDROPHILIC SEGMENT TO IMPART STAIN RELEASE PROPERTIES TO A SUBSTRATE

(75) Inventors: Kathy E. M. L. A. Allewaert, Haacht; Frans A. Audenaert, Kaprijke; Pierre J. Vander Elst, Elewijt, all of (BE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/381,864

(22) PCT Filed: May 14, 1998

(86) PCT No.: PCT/US98/09872

§ 371 Date: Sep. 24, 1999

§ 102(e) Date: Sep. 24, 1999

(87) PCT Pub. No.: WO97/14842

PCT Pub. Date: Apr. 24, 1997

(30) Foreign Application Priority Data

May 14, 1997 (EP) .................................................. 97201388

(51) Int. Cl.$^7$ ......................... C08G 18/28; C08G 18/62; C08G 18/48; D06M 15/576; D06M 13/428
(52) U.S. Cl. ....................... 252/8.62; 252/8.61; 252/8.81; 252/8.84; 252/8.85; 252/8.86; 526/242; 528/70
(58) Field of Search ................................. 252/8.61, 8.62, 252/8.81, 8.84, 8.85, 8.86; 526/242; 528/70

(56) References Cited

U.S. PATENT DOCUMENTS

| 2,803,615 | 8/1957 | Ahlbrecht et al. ................... 260/29.6 |
| 2,841,573 | 7/1958 | Ahlbrecht et al. ................... 260/79.3 |
| 3,269,961 | 8/1966 | Bruson et al. ......................... 260/2.5 |
| 3,574,791 | 4/1971 | Sherman et al. ...................... 260/884 |
| 3,920,614 | 11/1975 | Kirimoto et al. ....................... 260/63 |
| 4,046,944 | 9/1977 | Mueller et al. ........................ 428/262 |
| 4,399,077 | 8/1983 | Vanlerberghe et al. ........ 260/501.13 |
| 4,508,916 | 4/1985 | Newell et al. ........................ 556/420 |
| 4,540,765 | 9/1985 | Koemm et al. ......................... 528/45 |
| 4,563,493 | 1/1986 | Fukui et al. .......................... 524/233 |
| 4,695,488 | 9/1987 | Hisamoto et al. ................. 427/385.5 |
| 4,778,915 | 10/1988 | Lina et al. .............................. 560/29 |
| 4,788,287 | 11/1988 | Matsuo et al. ........................ 544/196 |
| 4,792,354 | 12/1988 | Matsuo et al. ........................... 106/2 |
| 4,841,090 | 6/1989 | Patel ..................................... 558/437 |
| 4,859,754 | 8/1989 | Maekawa et al. .................... 526/245 |
| 4,920,190 | 4/1990 | Lina et al. ............................ 526/288 |
| 5,100,954 | 3/1992 | Itoh et al. ............................. 524/805 |
| 5,107,033 | 4/1992 | Pechold ................................ 568/615 |
| 5,276,175 | 1/1994 | Dams et al. ............................ 560/27 |
| 5,292,796 | 3/1994 | Dams et al. .......................... 524/598 |
| 5,350,795 | 9/1994 | Smith et al. .......................... 524/507 |
| 5,453,540 | 9/1995 | Dams et al. ............................ 564/96 |
| 5,491,261 | 2/1996 | Haniff et al. ......................... 562/582 |
| 5,509,939 | 4/1996 | Kirchner ............................. 8/115.51 |
| 5,672,651 | 9/1997 | Smith .................................. 524/590 |

FOREIGN PATENT DOCUMENTS

| 526976 | 1/1997 | (EP) . |
| 2 050 396 | 1/1981 | (GB) . |
| 8-225493 | 3/1996 | (JP) . |
| WO 94/10222 | 5/1994 | (WO) . |

OTHER PUBLICATIONS

X–H. Yu et al., "Synthesis and Physical Properties of Poly-(fluoralkylether) urethanes", *Journal of Applied Polymer Science*, vol. 41, 1777–1795 (1990). (No month).

Primary Examiner—Anthony Green
(74) Attorney, Agent, or Firm—Kent S. Kokko

(57) ABSTRACT

The present invention provides a method for preparing a fluorochemical composition comprising polyurethane by reacting: (A) fluorochemical oligomer of formula (I): $M^f_m M_n$—$Q^1$—$T^1$ wherein: $M^f_m M_n$ represents flurochemical oligomer comprising m units derived from fluorinated monomer and n units derived from fluorine-free monomer and wherein the fluorinated monomers and fluorine-free monomers may be the same or different; m represents a value of 2 to 40; n represents a value of 0 to 20; $T^1$ is —OH or —$NH_2$; $Q^1$ and $T^1$ together represent an organic residue obtained by removing a hydrogen atom from a chain transfer agent that is functionalized with $T^1$; and (B) difunctional compound capable of reacting with an isocyanate and comprising a poly(oxyalkylene) group having 18 to 280 oxyalkylene moieties with (C) diisocyanate or triisocyanate. Substrates treated with the fluorochemical composition prepared according to the method described above, have good stain release properties in particular for oily stains and water based stains such as wine, tea and coffee.

19 Claims, No Drawings

FLUOROCHEMICAL COMPOSITION COMPRISING A POLYURETHANE HAVING A FLUOROCHEMICAL OLIGOMER AND A HYDROPHILIC SEGMENT TO IMPART STAIN RELEASE PROPERTIES TO A SUBSTRATE

FIELD OF THE INVENTION

The present invention relates to fluorochemical compositions for the treatment of substrates, in particular fibrous substrates such as textiles to impart stain release properties to those substrates.

BACKGROUND OF THE INVENTION

Fluorochemical compositions for the treatment of substrates such as leather, textiles and paper are well known and are used to impart various properties to the substrate such as water and/or oil repellency, waterproofness, stain release, anti-staining etc. For example, U.S. Pat. No. 5,276,175 discloses isocyanate derivatives comprising fluorochemical oligomers. In particular, the disclosed fluorochemical compositions comprise fluorinated compounds, wherein the fluorinated compound comprises a fluorochemical oligomeric portion, an organic moiety, and a group that can impart soft hand, stain release, water repellency, or a durable property when the compound is applied to a fibrous substrate, wherein the fluorochemical oligomeric portion is bonded to the organic moiety through an isocyanate-derived linking group. Substrates so treated are shown to exhibit particularly durable and abrasion-resistant oil and water repellency. Further, in one of the examples there is shown a fluorochemical composition that is based on a condensate of a tri-isocyanate, a fluorochemical oligomer and a methoxypolyethyleneoxide glycol. For this composition stain release properties are demonstrated on a polyester/cotton blend fabric.

U.S. Pat. No. 5,350,795 discloses fluorochemical compositions for treating textile fibers and fabrics to impart oil and water repellency without thermal treatment. The compositions comprise an aqueous, substantially organic solvent free, solution or dispersion of (a) a fluorochemical acrylate copolymer comprised of a fluorinated acrylate monomer, polyalkylene glycol acrylate or methacrylate, or polyalkylene glycol diacrylate or dimethacrylate; and (b) a polyalkoxylated polyurethane having pendant perfluoroalkyl groups comprised of an aliphatic or aromatic tri- or higher order isocyanate, a fluorinated alcohol, amine, or mercaptan, and a poly(oxyalkylene) diol or dithiol.

U.S. Pat. No. 4,788,287 and U.S. Pat. No. 4,792,354 disclose a water and oil repellent compound having at least two terminal segments and an intermediate segment connecting the terminal segments that has a molecular weight of from 800 to 20,000. Each terminal segment of the compound contains at least one polyfluoroalkyl group connected by a —CONH— linking group, the intermediate segment is a urethane oligomer containing at least two —CONH— linking groups in one molecule, and the terminal segments and intermediate segment are connected by a —CONH— linking group. The urethane oligomer of U.S. Pat. No. 4,792,354 further contains a hydrophilic molecular chain.

U.S. Pat. No. 5,491,261 discloses di-, tri- and poly-perfluoroalkyl-substituted alcohols and acids and derivatives thereof which are prepared from perfluoroalkyl iodides and di-, tri- or polyalkyl alcohols or acids. They can be reacted with isocyanates, epoxy compounds, anhydrides, acids or acid derivatives to prepare a great variety of oil- and water-repellent compositions.

Fluorochemical compositions are also used to facilitate stain or soil release from a substrate such as for example a fabric. Routine treatments of fabrics with modifying additives such as softeners, stiffeners and lubricants to impart desired properties to a commercial fabric typically increase the oleophilicity of the fabric, thereby significantly increasing its tendency to accept oily stains and reducing its ability to release such stains after laundering. Fluorochemical compositions based on a mixture of a fluorinated compound and a non-fluorinated hydrophilic compound or a chemical "hybrid" compound that contains fluorochemical oleophobic segments ("F") and non-fluorinated hydrophilic segments ("H") are known to act as stain release compositions since they provide oil repellency during normal wear and inhibit wicking or diffusion of oily soils into the fabric or fiber bundles as well as facilitate soil release during laundering.

U.S. Pat. No. 3,574,791 discloses a block-copolymer consisting of F and H segments for use as a stain-release agent. The "F"-segments are substantially free of hydrophilic groups whereas the "H" segments are substantially free of fluorinated aliphatic groups. It is taught that due to this segmentation, the polymer is "autoadaptable", i.e., a fabric treated with the polymer will be an oil and water repellent in an atmospheric environment, and when laundered in water, it will become hydrophilic so stain removal becomes possible. Various possible chemical linkages are contemplated for connecting the "F" and "H" segments, including a urethane linkage derived from the reaction of an alcohol and an isocyanate.

U.S. Pat. No. 5,509,939 discloses a fluorochemical composition to impart soil release properties to a substrate. The fluorochemical composition comprises urea-linkage-containing-alkoxypolyoxyalkylene fluorocarbamates prepared by reacting (a) at least one polyisocyanate which contains at least three isocyanate groups with (b) at least one fluorochemical reagent which contains one functional group which has at least one hydrogen atom and at least two carbon atoms each of which contains at least two F atoms, (c) at least one hydrophilic, water-solvable reagent which contains a single functional group which has at least one reactive hydrogen atom, (d) at least one reagent which contains one reactive hydrogen and which on reaction with an isocyanate group, yields functionality which has abeyant chemical reactivity with fibrous substrates, and then reacting the product with water such that reactants (b), (c) and (d) are reacted with 55% to 95% of the isocyanate groups, and water with the remainder.

Despite the many fluorochemical compositions known to impart stain release properties to a substrate, there continues to be a desire for fluorochemical compositions that have improved properties. Desirable properties for fluorochemical compositions include easy cleanability of natural fiber substrates such as cotton and blends of cotton and polyester, particularly with respect to oil-type stains (dirty motor oil, vegetable oil) and water based stains (tea, coffee); low manufacturing cost; high storage stability; easy emulsifiability and high performance even if applied in low quantities. It is further desirable that the fluorochemical compositions provide good stain repellency and oil and/or water repellency properties to the substrate.

SUMMARY OF THE INVENTION

The present invention provides a method for preparing a fluorochemical composition comprising polyurethane by reacting:

(A) fluorochemical oligomer of formula (I)

wherein:
$M^f_m M_n$ represents a fluorochemical oligomer comprising m units derived from fluorinated monomer and n units derived from fluorine-free monomer and wherein the fluorinated monomers and fluorine free-monomers may be the same or different;

m represents a value of about 2 to 40;

n represents a value of 0 to about 20;

$T^1$ is —OH or —$NH_2$;

$Q^1$ and $T^1$ together represent an organic residue obtained by removing a hydrogen atom from a chain transfer agent that is functionalized with $T^1$; and (B) difunctional compound capable of reacting with an isocyanate and comprising a poly(oxyalkylene)group having about 18 to 280 oxyalkylene moieties; with (C) diisocyanate or triisocyanate.

The present invention further provides a fluorochemical composition comprising a polyurethane obtainable by the above method and the use of the fluorochemical composition to provide stain release properties to a substrate.

In accordance with a further embodiment, there is provided a fluorochemical composition comprising: (i) polyurethane obtainable by reacting:

(A) fluorochemical oligomer of formula (I)

wherein:
$M^f_m M_n$ represents a fluorochemical oligomer comprising m units derived from fluorinated monomer and n units derived from fluorine-free monomer and wherein the fluorinated monomers and fluorine-free monomers may be the same or different;

m represents a value of about 2 to 40;

n represents a value of 0 to about 20;

$T^1$ is —OH or —$NH_2$;

$Q^1$ and $T^1$ together represent an organic residue obtained by removing a hydrogen atom from a chain transfer agent that is functionalized with $T^1$; and (B) difunctional compound capable of reacting with an isocyanate and comprising a poly(oxyalkylene)group; with (C) diisocyanate or triisocyanate; and (ii) polymer selected from the group consisting of polyvinyl alcohols, copolymers of (meth)acrylic acid, alkyl esters of (meth)acrylic acid, polyethylene glycols and non-ionic cellulose ethers.

Also provided is the use of a fluorochemical composition to impart stain release properties to a substrate, said fluorochemical composition comprising polyurethane obtainable by reacting:

(A) fluorochemical oligomer of formula (I)

wherein:
$M^f_m M_n$ represents a fluorochemical oligomer comprising m units derived from fluorinated monomer and n units derived from fluorine-free monomer and wherein the fluorinated monomers and fluorine-free monomers may be the same or different;

m represents a value of about 2 to 40;

n represents a value of 0 to about 20;

$T^1$ is —OH or —$NH_2$;

$Q^1$ and $T^1$ together represent the organic residue obtained by removing a hydrogen atom from a chain transfer agent that is functionalized with $T^1$; and (B) difunctional compound capable of reacting with an isocyanate and comprising a poly(oxyalkylene)group; with (C) diisocyanate or triisocyanate.

Further provided is the treatment of a substrate using one of the fluorochemical compositions described herein and a substrate treated with one of said fluorochemical compositions.

DETAILED DESCRIPTION OF THE INVENTION

In connection with the present invention, the term "difunctional" compound means a compound that has only two functional groups capable of reacting with an isocyanate.

The term "functionalized fluorochemical oligomer" means a fluorochemical oligomer that contains a functional group capable of reacting with an isocyanate.

The fluorochemical compositions of the present invention can be prepared in a two step reaction. In a first step, a functionalized fluorochemical oligomer is prepared, which is further reacted to form a polyurethane in the second step.

In the first step, fluorochemical oligomer according to formula (I) is prepared:

wherein:
$M^f_m M_n$ represents fluorochemical oligomer comprising m units derived from fluorinated monomer and n units derived from fluorine-free monomer and wherein the fluorinated monomers and fluorine-free monomers may be the same or different;

m represents a value of about 2 to 40;

n represents a value of 0 to about 20;

$T^1$ is —OH or —$NH_2$; and $Q^1$ and $T^1$ together represent the organic residue obtained by removing a hydrogen atom from a chain transfer agent that is functionalized with $T^1$.

The value of m in the fluorochemical oligomer is between about 2 and 40 and preferably between about 2 and 20 and more preferably between about 3 and 15. The value of n can be from 0 to about 20 and is preferably between about 3 and 10. According to a preferred embodiment, the value of n is less than that of m. Fluorochemical oligomers derived from two or more different fluorinated monomers and/or two or more different fluorine free monomers are within the scope of this invention.

In the above formulas, $Q^1$ typically represents an organic residue according to the following formula:

wherein
R represents an organic divalent linking group that is preferably selected from the group consisting of linear or branched alkylenes (preferably having about 2 to 6 carbon atoms), cyclic alkylenes, arylenes and aralkylenes.

The fluorochemical oligomer can be prepared by free-radical oligomerization of fluorochemical monomers ($R_f$—$L^1$—E) alone or in combination with hydrocarbon monomers ($R_h$—E'), in the presence of hydroxy- or amino-functionalized chain transfer agents. The term "hydrocarbon", in connection with the present invention, means any substantially fluorine-free organic moiety that contains hydrogen and carbon and optionally one or more substituents. The aliphatic backbone of the fluorochemical oligomeric portion comprises a sufficient number of polymerized units to render the portion oligomeric. The aliphatic backbone preferably comprises from 2 to about 40 polymerized units derived from fluorochemical monomers and from 0 to about 20 polymerized units derived from hydrocarbon monomers. The $R_n$ group in the hydrocarbon monomer is a fluorine-free organic group.

The fluoroaliphatic radical, $R_f$, in the fluorochemical monomer, is a fluorinated, stable, inert, preferably saturated, non-polar, monovalent aliphatic radical. It can be straight chain, branched chain, cyclic or combinations thereof. It can contain heteroatoms such as oxygen, divalent or hexavalent sulfur, or nitrogen. $R_f$ is preferably a fully-fluorinated radical, but hydrogen or chlorine atoms can be present as substituents if not more than one atom of either is present for every two carbon atoms. The $R_f$ radical has at least about 3 and up to about 18 carbon atoms, preferably about 3 to 14, especially about 6 to 12 carbon atoms, and preferably contains about 40% to 80% fluorine by weight, more preferably about 50% to 78% fluorine by weight. The terminal portion of the $R_f$ radical is a perfluorinated moiety, which will preferably contain at least 7 fluorine atoms. e.g., $CF_3CF_2CF_2$—, $(CF_3)_2CF$—, $F_5SCF_2$—. The preferred $R_f$ radicals are fully or substantially fluorinated and are preferably follow the formula $C_nF_{2n+1}$— where n is about 3 to 18.

The linking group, $L^1$, links the $R_f$ group to the free radical polymerizable group E. $L^1$ preferably contains from 1 to about 20 carbon atoms. $L^1$ can optionally contain oxygen, nitrogen, or sulfur-containing groups or a combination thereof, and $L^1$ is preferably free of functional groups that substantially interfere with free-radical oligomerization (e.g., polymerizable olefinic double bonds, thiols, and other such functionality known to those skilled in the art). Examples of suitable $L^1$ groups include straight chain, branched chain or cyclic alkylene, arylene, aralkylene, oxy, oxo, hydroxy, thio, sulfonyl, sulfoxy, amino, imino, sulfonamido, carboxyamido, carbonyloxy, urethanylene, and ureylene groups, and combinations thereof such as sulfonamidoalkylene. Preferred linking groups are selected from the group consisting of alkylene groups, poly (oxyalkylene) groups having about 1 to 4 oxyalkylene moieties and organic divalent linking groups according to the following formula:

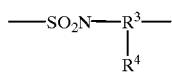

wherein:

$R^3$ represents a linear or branched alkylene group having 2 to 4 carbon atoms, and $R^4$ represents an alkyl group having 1 to 4 carbon atoms.

E and E' are free radically polymerizable groups that typically contain an ethylenically unsaturated group capable of polymerization with itself or each other. Suitable groups include, for example, moieties derived from vinyl ethers, vinyl esters, allyl esters, vinyl ketones, styrene, vinyl amide, acrylamides, maleates, fumarates, acrylates and methacrylates. Of these, the esters of alpha, beta unsaturated acids, such as the acrylates and methacrylates are preferred.

Fluorochemical monomers $R_f$—$L^1$—E as described above and methods for the preparation thereof are known and disclosed, e.g., in U.S. Pat. No. 2,803,615. Examples of such compounds include general classes of fluorochemical acrylates, methacrylates, vinyl ethers, and allyl compounds containing fluorinated sulfonamido groups, acrylates or methacrylates derived from fluorochemical telomer alcohols, acrylates or methacrylates derived from fluorochemical carboxylic acids, and perfluoroalkyl acrylates or methacrylates as disclosed in EP-A-526 976.

Preferred examples of fluorochemical monomers include:

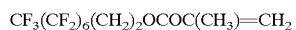
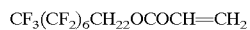
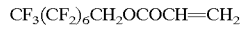
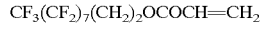

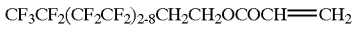

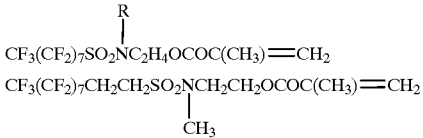

R=methyl, ethyl or n-butyl

Suitable hydrocarbon monomers $R_h$—E' are also known and generally commercially available. Examples of such compounds include the general classes of ethylenic compounds capable of free-radical polymerization, such as, for example, allyl esters such as allyl acetate and allyl heptanoate; alkyl vinyl ethers or alkyl allyl ethers such as cetyl vinyl ether, dodecylvinyl ether, 2-chloroethylvinyl ether, ethylvinyl ether; unsaturated acids such as acrylic acid, methacrylic acid, alpha-chloro acrylic acid, crotonic acid, maleic acid, fumaric acid, itaconic acid and their anhydrides and esters such as vinyl, allyl, methyl, butyl, isobutyl, hexyl, heptyl, 2-ethyl-hexyl, cyclohexyl, lauryl, stearyl, isobornyl or alkoxy ethyl acrylates and methacrylates; alpha-beta unsaturated nitriles such as acrylonitrile, methacrylonitrile, 2-chloroacrylonitrile, 2-cyanoethyl acrylate, alkyl cyanoacrylates; alpha, beta-unsaturated carboxylic acid derivatives such as allyl alcohol, allyl glycolate, acrylamide, methacrylamide, n-diisopropyl acrylamide, diacetoacrylamiide, N,N-diethylaminoethylmethacrylate, N-t-butylamino ethyl methacrylate; styrene and its derivatives such as vinyl toluene, alpha-methylstyrene, alpha-cyanomethyl styrene; lower olefinic hydrocarbons which contain halogen such as ethylene, propylene, isobutene, 3-chloro-1-isobutene, isoprene, and allyl or vinyl halides such as vinyl and vinylidene chloride. Preferred co-monomers which can be copolymerized with the above-described fluoroaliphatic radical-containing monomers include those selected from octadecylmethacrylate, laurylmethacrylate, butylacrylate, N-methylol acrylamide, isobutylmethacrylate, ethylhexyl acrylate, ethylhexyl methacrylate, lycidyl methacrylate, vinylchloride and vinylidene chloride.

The hydroxy- or amino-functionalized chain transfer agents useful in the preparation of the fluorochemical oligomer preferably correspond to the following formula:

wherein:

R is as defined herein, and

X is an —OH or —NH$_2$ moiety.

Examples of chain transfer agents include those selected from 2-mercaptoethanol, 3-mercapto-2-butanol, 3-mercapto-2-propanol, 3-mercapto-1-propanol and 2-mercapto-ethylamine. A single compound or a mixture of different chain transfer agents may be used. A preferred chain transfer agent is 2-mercaptoethanol.

In order to prepare the functionalized fluorochemical oligomer, a free-radical initiator is normally present. Such free-radical initiators are known in the art and include azo compounds, such as azobisisobutyronitrile (AIBN) and azobis(2-cyanovaleric acid) and the like, hydroperoxides such as cumene, t-butyl, and t-amyl hydroperoxide, dialkyl peroxides such as di-t-butyl and dicumylperoxide, peroxyesters such as t-butylperbenzoate and di-t-butylperoxy phtalate, diacylperoxides such as benzoyl peroxide and lauroyl peroxide.

In a second step, the fluorochemical oligomer (or mixture of fluorochemical oligomers) and the difunctional compound capable of reacting with an isocyanate group are reacted with a diisocyanate or triisocyanate, to obtain the polyurethane. The reaction may further involve an isocyanate blocking agent or a fluorine-free oligomer. It will be appreciated by one skilled in the art that the preparation of polyurethanes according to the present invention results in a mixture of compounds.

If diisocyanate is used, the fluorochemical oligomer is preferably used in amount sufficient to react with about 9% to 50% of the number of isocyanate groups, the difunctional compound is preferably used is an amount sufficient to react about 50% to 90% of the isocyanate groups and the isocyanate blocking agent or fluorine-free oligomer is preferably used in an amount sufficient to react 0 to about 25% of the isocyanate groups.

In case a triisocyanate or a mixture with a diisocyanate is used, the fluorochemical oligomer is preferably used in amount sufficient to react with about 6% to 33% of the number of isocyanate groups, the difunctional compound is preferably used is an amount to react about 33% to 61% of the isocyanate groups and the isocyanate blocking agent or fluorine-free oligomer is preferably used to react about 25 to 40%, more preferably about 28% to 33% of the isocyanate groups.

An oxyalkylene moiety in the poly(oxyalkylene) group contained in the difunctional compound preferably has about 2 to 4 carbon atoms. Examples of such moieties include —OCH$_2$—CH$_2$—, —OCH$_2$—CH$_2$—CH$_2$—, —OCH(CH$_3$) CH$_2$—, and —OCH(CH$_3$)CH(CH$_3$)—. The oxyalkylene moieties in the poly(oxyalkylene) group can be the same (e.g., poly(oxypropylene)), or present as a mixture (e.g., a heteric straight or branched chain or a chain of randomly distributed oxyethylene and oxypropylene moieties, or a straight or branched chain of blocks of oxyethylene moieties and blocks of oxypropylene moieties). The backbone of poly(oxyalkylene) groups can be interrupted by or include one or more catenary linkages. Where the catenary linkages have three or more valences, they provide a means for obtaining a branched chain of oxyalkylene moieties. The poly(oxyalkylene) group contained in the difunctional compound preferably contains between about 18 and 280 and more preferably between about 22 and 182 of oxyalkylene units.

Preferred difunctional compounds comprising a poly(oxyalkylene) group correspond to the following formula:

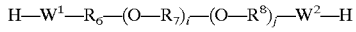

wherein:

R$^6$ represents a linear or branched alkylene having about 1 to 4 carbon atoms;

R$^7$ and R$^8$ are each independently selected from the group consisting of linear or branched alkylene groups having 2 to 4 carbon atoms;

W$^1$ and W$^2$ are each independently selected from the group consisting of O, S and NH;

i and j are each independently selected integers of 0 to 150, provided the sum of i and j is at least about 8.

Preferably, R$^7$ ethylene and R$^8$ is linear or branched propylene and the ratio of i to j is at least 1 and preferably greater than 1. Most preferably, R$^7$ is ethylene and j is 0.

Examples of difunctional compounds include polyalkylene glycols (e.g., polyethylene glycol), a hydroxy-tenninated copolymer (including a block copolymer) of ethyleneoxide and propylene oxide, a diamino-terminated poly(alkylene oxide), Jeffamines™ ED having a molecular weight between 600 and 6000, Jeffamine™ EDR-148 and poly(oxyalkylene) thiols.

Diisocyanate or triisocyanates for use in accordance with the present invention include aliphatic and aromatic isocyanates. Examples include aromatic diisocyanates such as 4,4'-methylenediphenylenediisocyanate, 4,6-di-(trifluoromethyl)-1,3-benzene diisocyanate, 2,4-toluenediisocyanate, 2,6-toluene diisocyanate, o, m, and p-xylylene diisocyanate, 4,4'-diisocyanatodiphenylether, 3,3'-dichloro-4,4'-diisocyanatodiphenylmethane, 4,5'-diphenyldiisocyanate, 4,4'-diisocyanatodibenzyl, 3,3'-dimethoxy-4,4'-diisocyanatodiphenyl, 3,3'-dimethyl-4,4'-diisocyanatodiphenyl, 2,2'-dichloro-5,5'-dimethoxy-4,4'-diisocyanato diphenyl, 1,3-diisocyanatobenzene, 1,2-naphthylene diisocyanate, 4-chloro-1,2-naphthylene diisocyanate, 1,3-naphthylene diisocyanate, and 1,8-dinitro-2,7-naphthylene diisocyanate; alicyclic diisocyanates such as 3-isocyanatomethyl-3,5,5-trimethylcyclohexylisocyanate; 3-isocyanatomethyl-3,5,5-trimethylcyclohexylisocyanate; aliphatic diisocyanates such as 1,6-hexamethylenediisocyanate, 2,2,4-trimethyl-1,6-hexamethylenediisocyanate, and 1,2-ethylenediisocyanate; aliphatic triisocyanates such as 1,3,6-hexamethylenetriisocyanate; aromatic triisocyanates such as polymethylenepolyphenylisocyanate (PAPI); cyclic diisocyanates such as isophorone diisocyanate (IPDI) and dicyclohexylmethane-4,4'-diisocyanate.

Also useful are isocyanates containing internal isocyanate-derived moieties such as biuret-containing triisocyanates such as that available from Bayer as DESMO-DUR™ N-100, isocyanurate-containing triisocyanates such as that available from Huls AG, Germany, as IPDI-1890, and azetedinedione-containing diisocyanates such as that available from Bayer as DESMODUR™ TT. Also, other diisocyanate or triisocyanates such as those available from Bayer as DESMODUR™ L and DESMODLTR™ W, and tri-(4-isocyanatophenyl)-methane (available from Bayer as DES-MODUR™ R) are suitable.

The fluorine-free oligomer optionally used in the preparation of the polyurethanes, may be prepared using a procedure similar to the preparation of the fluorochemical oligomer except that only fluorine-free monomers are used. Suitable fluorine-free monomers include those of the type $R_h$—E' described above. According to a particularly preferred embodiment, the fluorine-free oligomer is derived from an oligomerization of at least one monomer that includes a functional group capable of cross-linking upon activation for example, by heat. Typical examples of such functional groups include blocked isocyanates and alkoxysilane groups. Examples of monomers including a functional group capable of cross-linking upon activation include alkoxysilane functionalized acrylates or methacrylates or monomers that contain a blocked isocyanate such as the reaction product of 2-hydroxy-ethyl-(meth)acrylate, a diisocyanate and an isocyanate blocking agent. The fluorine-free oligomer preferably has a polymerization degree between about 2 and 40 and more preferably between about 3 and 20.

Optionally isocyanate blocking agents may be used in this invention. Such agents include compounds that, upon reaction with a compound containing an isocyanate group, form a compound that is unreactive at room temperature with an isocyanate-reactive compound but which reacts with isocyanate-reactive compounds at elevated temperatures. Suitable isocyanate blocking agents will typically react with isocyanate-reactive compounds at a temperature of about 50 to 190° C. Examples of suitable isocyanate blocking agents include aryl alcohols (e.g., phenols, cresols, nitrophenols, o- and p-chlorophenol, napthols, 4-hydroxybiphenyl); $C_2$ to $C_8$ alkanone oximes (e.g., acetone oxime, butanone oxime); benzophenone oxime; aryl-thiols (e.g., thiophenol); organic carbanion active hydrogen compounds (e.g., diethyl malonate, acetylacetone, ethyl acetoacetate, ethylcyanoacetate) and epsilon-caprolactone. A single compound or a mixture of different masking or blocking agents may be used. Particularly preferred isocyanate blocking or masking agents include $C_2$ to $C_8$ alkanone oximes, e.g., 2-butanone oxime.

The condensation reaction is carried out under conventional conditions well-known to those skilled in the art. Preferably the reaction is run in the presence of a catalyst. Suitable catalysts include tin salts such as dibutyltin dilaurate, stannous octanoate, stannous oleate, tin dibutyldi-(2-ethyl hexanoate), stannous chloride; and others known to those skilled in the art. The amount of catalyst present will depend on the particular reaction, and thus it is not practical to recite particular preferred concentrations. Generally, however, suitable catalyst concentrations are from about 0.001 percent to 10 percent, and preferably about 0.1 percent to 5 percent, by weight based on the total weight of the reactants.

The condensation reaction is preferably carried out under dry conditions in a polar solvent such as ethyl acetate, acetone, methyl isobutyl ketone, toluene and the like. Suitable reaction temperatures will be easily determined by those skilled in the art based on the particular reagents, solvents, and catalysts being used. While it is not practical to enumerate particular temperatures suitable for all situations, generally suitable temperatures are between about room temperature and about 120° C.

The fluorochemical composition of this invention can be applied using conventional application methods but is preferably used as an aqueous emulsion. Alternatively it can be used as a treatment composition in solvent. An aqueous emulsion will generally contain water, an amount of fluorochemical composition effective to provide the desired repellent properties to a substrate treated therewith, and a surfactant in an amount effective to stabilize the emulsion. Water is preferably present in an amount of about 70 to 2000 parts by weight based on 100 parts by weight of the fluorochemical composition of the invention. The surfactant is preferably present in an amount of about 1 to 25 parts by weight, preferably about 2 to 10 parts by weight, based on 100 parts by weight of the fluorochemical composition. Conventional cationic, nonionic, anionic, and zwitterionic surfactants are suitable.

The amount of aqueous or solvent-based treating composition applied to a substrate should be sufficient to impart high stain release properties to the substrate. Typically, an amount of treating composition sufficient to provide about 0.01% to by weight, preferably about 0.05% to 2% by weight, based on the weight of the substrate, of fluorochemical composition on the treated substrate is adequate. The amount which is sufficient to impart desired stain release can be determined empirically and can be increased as necessary or desired.

To the fluorochemical composition of the invention there may also be added other fluorinated products, polymers or auxiliary products such as starch, dextrin, casein, polyvinyl alcohols, cellulose and cellulose derivatives such as cellulose ethers, copolymers of (meth)acrylic acid and an alkyl (meth)acrylate, polyglycols such polyethylene glycols, sizing agents, materials to improve water and/or oil repellency, fire proofing or antistatic properties, buffering agents, fungicidal agents, optical bleaching agents, sequestering agents, mineral salts, surface-active agents, or swelling agents to promote penetration. Preferably, copolymers of an alkyl (meth)acrylate and (meth)acrylic are used auxiliary products in the fluorochemical composition. Typically, the weight ratio of meth(acrylic) acid to alkyl (meth)acrylate in such polymers is between about 20:80 and 90:10, and more preferably is between about 50:50 and 85:15. It is further preferred that the alkyl group of the (meth)acrylate monomer is a lower alkyl group having about 1 to 6 carbon atoms. Examples of alkyl (meth)acrylate monomers include, methyl, ethyl and n-butyl acrylates and methacrylates. The copolymer of an alkyl (meth)acrylate and (meth)acrylic acid may further contain units derived from ethylenically unsaturated monomers but preferably the copolymer only consists of units or moieties derived from alkyl (meth)acrylates and (meth)acrylic acid. The copolymer may also be partially or fully neutralized with a base such as sodium hydroxide or ammonium hydroxide.

Particularly suitable auxiliary products for use in the fluorochemical composition include polyvinyl alcohols and non-ionic cellulose ethers. It has been found that when the fluorochemical composition of the invention contains at least a polyvinyl alcohol or a non-ionic cellulose ether, the ability to release stains can be substantially improved relative to a fluorochemical composition that does not include these auxiliary products. Examples of non-ionic cellulose ether derivatives include methyl cellulose, hydroxypropyl cellulose and methylhydroxypropyl cellulose. Preferably, the etherified cellulose is highly hydrophilic. Accordingly, cellulose ethers that contain large hydrophobic substituents such as the hydrophobically modified cellulose ether (available under the tradename NEXTON™ from Aqualon) are not preferred for use in the fluorochemical composition of this invention. A substantial improvement was noticed for many fluorochemical compositions that contain polyvinyl alcohol or a non-ionic cellulose ether, relative to releasing dirty motor oil stains, while a less pronounced improvement has been observed for the release of tea or wine stains. This finding is rather surprising since the addition of other hydrophilic polymers, such as ionic cellulose ethers, did not show this improvement and even reduced the stain release performance of certain fluorochemical composition.

The substrates treated by the fluorochemical composition of this invention are not especially limited and include plastic, metal, glass, fibrous materials such as textile fabrics, wood, non-wovens and paper. The fluorochemical composition is particularly useful for imparting stain release properties to a substrate that comprises natural fibers, in particular a substrate that consists of cellulose fibers or a substrate consisting of cellulose and polyester fibers. Substrates treated with a fluorochemical composition of this invention have particular good stain release properties for dirty motor oil stains and tea stains.

In order to affect treatment of a textile substrate, the substrate can be immersed in a diluted emulsion. The saturated substrate can then be run through a padder/roller to remove excess emulsion, dried and cured in an oven at a temperature and for a time sufficient to provide a cured treated substrate. This curing process is typically carried out at temperatures between about 50° C. and 190° C. depending on the particular system or application method used. In general, a temperature of about 120° C. to 170° C., in particular of about 150° C. to 170° C. for a period of about 20 seconds to 10 minutes, preferably 3 to 5 minutes, is suitable.

The invention is further illustrated by reference to the following examples without however the intention to limit the invention thereto.

EXAMPLES

Formulation and Treatment Procedure

Treatment baths were formulated containing a defined amount of the fluorochemical treatment agent. Treatments were applied to the test substrates by padding to provide a concentration of 0.3% or 0.6% solids (based on fabric weight and indicated as SOF (solids on fabric)) and drying the samples at 150° C. during 3 minutes. The test substrates used in the Examples were commercially available and are listed below:

* PES/CO: polyester/cotton 67/33 blends, available from Arlitex, Avelgem, Belgium.
* 100% cotton: available from UCO company, Destelbergen, Belgium After drying, the substrates were tested for their stain release and repellency properties.

Respective data of stain release, water and oil repellency shown in the Examples and Comparative Examples were based on the following methods of measurement and evaluation criteria:

Stain Release Test

The stain release test was performed using two types of stains:

Dirty Motor Oil (DMO) obtained from General Motors Garage Houttequiet, Beveren; Belgium Tea: obtained by immersing a Lipton™ yellow teabag in 165 ml at 65° C. for 3 minutes Staining Procedure 1: Drop Method 10 cm×10 cm test samples were stained with 3 drops DMO or tea for PES/CO or with 4 drops DMO or tea for cotton. The samples were equilibrated at room temperature during 24 hours after which the degree of staining was evaluated by measuring the difference in reflection of a stained versus unstained sample, using a Minolta color meter (Lamp D65). An average of 3 measurements were done for each stain, resulting in a $\Delta L_{IN}$ value.

Staining Procedure 2: Brush Method

For this procedure, 0.35 ml DMO or 0.5 ml tea for PES/CO or 0.5 ml DMO or 0.6 ml tea for cotton were placed on 10 cm×10 cm test samples. The stain was brushed into the fabric by brushing 3 times around in a plastic holder of 5 cm diameter placed around the staining liquid. The reflection measurement was done as described above.

Laundering procedure

The test samples were pinned on a PES/CO ballast (total 3 kg) or a cotton ballast (total 4 kg), and laundered in a Miele washing machine type W 832. A commercial detergent (20 g/kg Clax 100 for PES/CO or Clax crystal for cotton, available from Diversy Lever) was added and the substrates were washed at 70° C., using the main washing program, followed by four rinse cycles and centrifuging. The samples were dried in a tumble dryer and ironed at 150° C. for 15 seconds. Unstained samples were treated the same way. The samples were measured with the Minolta meter and compared to unstained samples, resulting in a $\Delta L_{LD70° C.}$ value. The less negative value for $\Delta L_{LD70° C.}$ obtained compared to $\Delta L_{IN}$, the better the stain release properties were. %$\Delta\Delta L$, calculated according to formula %$\Delta\Delta L=(\Delta L_{IN}-\Delta L_{LD70° C.}/\Delta L_{IN})\times 100$ gave an indication of the percentage of stain removed during the laundering process. The higher the value, the better the stain removal.

Water Repellency Test (WR)

The water repellency (WR) of a substrate was measured using a series of water-isopropyl alcohol test liquids and was expressed in terms of the "WR" rating of the treated substrate. The WR rating corresponded to the most penetrating test liquid which did not penetrate or wet the substrate surface after 15 seconds exposure. Substrates which were penetrated by or were resistant only to 100% water (0% isopropyl alcohol) test liquid, the least penetrating test liquid, were given a rating of 0. Substrates resistant to test liquid which was 100% isopropyl alcohol (0% water), the most penetrating test liquid, were given a rating of 10. Other intermediate ratings were calculated by dividing the percent isopropylalcohol in the test liquid by 10, e.g., a treated substrate resistant to a 70%/130% isopropyl alcohol/water blend, but not to an 80%/20% blend, would be given a rating of 7.

Oil Repellency (OR)

The oil repellency of a substrate was measured by the American Association of Textile Chemists and Colorists (AATCC) Standard Test Method No. 118-1983, which test was based on the resistance of a treated substrate to penetration by oils of varying surface tensions. Treated substrates resistant only to Nujol® mineral oil (the least penetrating of the test oils) were given a rating of 1, whereas treated substrates resistant to heptane (the most penetrating of the test liquids) were given a rating of 8. Other intermediate values were determined by use of other pure oils or mixtures of oils, as shown in the following table.

| Standard Test Liquids | |
|---|---|
| AATCC Oil Repellency Rating Number | Compositions |
| 1 | Nujol ® |
| 2 | Nujol ®/n-Hexadecane 65/35 |
| 3 | n-Hexadecane |
| 4 | n-Tetradecane |
| 5 | n-Dodecane |
| 6 | n-Decane |
| 7 | n-Octane |
| 8 | n-Heptane |

Abbreviations

The following abbreviations and trade names were used in the Examples and Comparative Examples:

EtOAc: ethylacetate
RSH: 2-mercapto ethanol
AIBN: azo(bis)isobutyronitrile
HOEMA: 2-hydroxyethyl methacrylate
BA: butylacrylate
DIAA: diaceto acrylamide
MEFOSEA: N-methyl perfluorooctyl sulfonamido ethyl acrylate
PEG$^{200-8000}$: polyethylene glycol, superscript number is indicative of Mw, available from Huls, Germany
IPA: isopropyl alcohol
TEA: triethylamine
GMA: glycidyl methacrylate (2,3-epoxypropyl methacrylate)
BO: 2-butanone oxime
IPDI: isophorone diisocyanate
DBTDL: dibutyltin dilaurate
MEHQ: methylhydroquinone
DESW : dicyclohexyl methane-4,4'-diisocyanate, available from Bayer (Germany) as DESMODUR™ W
DESN: aliphatic polyisocyanate, available from Bayer (Germany) as DESMODUR™ N
DESL: aromatic triisocyanate, available from Bayer (Germany) as DESMODUR™ L
Arquad T-50: tallow trimethyl ammonium chloride, available from Akzo, Littleborough, UK
PVA: polyvinyl alcohol
Mowiol™: polyvinyl alcohol with various weight average molecular weights as indicated in the table, available from Hoechst

| Mowiol™ type | Degree of hydrolysis | Molecular weight |
| --- | --- | --- |
| Mowiol™ 3-83 | 83 | 14000 |
| Mowiol™ 3-98 | 98 | 16000 |
| Mowiol™ 10-74 | 74 | 20000 |
| Mowiol™ 4-98 | 98 | 27000 |
| Mowiol™ 5-88 | 88 | 35000 |
| Mowiol™ 10-98 | 98 | 61000 |
| Mowiol™ 15-79 | 79 | 100000 |
| Mowiol™ 20-98 | 98 | 125000 |
| Mowiol™ 18-88 | 88 | 130000 |
| Mowiol™ 28-98 | 98 | 145000 |
| Mowiol™ 26-88 | 88 | 160000 |
| Mowiol™ 40-88 | 88 | 205000 |

Polyvinyl™: polyvinyl alcohol, of various grades according to the table, available from Wacker-Chemie

| Polyviol™ type | Degree of hydrolysis (mol %) |
| --- | --- |
| Polyviol™ V03/240 | 75–79 |
| Polyviol™ V03/180 | 82–85 |
| Polyviol™ V03/140 | 86–89 |
| Polyviol™ G04/20 | 97.5–99.58 |
| Polyviol™ M05/290 | 69–73 |
| Polyviol™ M05/140 | 86–89 |
| Polyviol™ W25/190 | 81–84 |
| Polyviol™ W25/100 | 90–93 |
| Polyviol™ W45/450 | 42–50 |

Culminal™ MHPC 50: Methylhydroxypropyl cellulose, available from Aqualon

Culminal™ MC25 PF: Methyl cellulose, available from Aqualon
Klucel™ M: Hydroxypropyl cellulose, with 2% Brookfield viscosity of 5000 mPas., available from Aqualon
Klucel™ E: Hydroxypropyl cellulose with 2% Brookfield viscosity of 7 mPas, available from Aqualon
Klucel™ L: Hydroxypropyl cellulose with 2% Brookfield viscosity 10 mPas, available from Aqualon
Nexton™ D-1200: hydrophobically modified hydroxyethyl cellulose, available from Aqualon
Nexton™ D-2500 W: hydrophobically modified hydroxyethyl cellulose with 2% Brookfield viscosity of 25,000, available from Aqualon
Blanose™ CMC: sodium carboxymethyl cellulose, available from Aqualon
Cellulose gum 7L: sodium carboxymethyl cellulose, available from Aqualon All parts, ratios, percentages etc. in the following examples are by weight unless otherwise noted.

A. Synthesis of Hydroxy Terminated Oligomers (HTO)

1. Synthesis of urethane acrylate HOEMA/IPDI/BO (molar ratio 1/1/1)

The urethane acrylate HOEMA/IPDI/BO (molar ratio 1/1/1), used in the preparation of hydroxy terminated oligomers was prepared as follows:

A round bottom flask equipped with a mechanical stirrer, a temperature control, addition funnel, and nitrogen inlet and outlet, was charged with 111 g (0.5 moles) IPDI, 65 g (0.5 moles) HOEMA, 200 g EtOAc, 0.1 g phenotiazin, 0.1 g MEHQ and 0.2 g dibutyl tin dilaurate. The reaction mixture was slowly heated to about 50° C. A solution of 44 g (0.5 moles) 2-butanone oxime, dissolved in 20 g EtOAc was added over a period of 1 hour. Then the reaction mixture was stirred at 72° C. for 6 hours. IR analysis indicated that all isocyanate groups had reacted.

2. Synthesis of hydroxy terminated oligomers (HTO)

Hydroxy terminated oligomers (HTO) of Table 1 were made using a procedure similar to the synthesis of MEFOSEA/RSH 4/1 (indicated as HTO-1 in Table 1):

A round bottom flask equipped with two reflux condensers, a stirrer, a temperature control, a nitrogen inlet and a vacuo outlet was charged with 2.4 moles (1433 g) MEFOSEA and 987 g EtOAc. The mixture was heated at 40° C. until all fluorochemical monomers were dissolved. 0.6 moles (46.8 g) 2-mercaptoethanol and 0.15% AIBN were added. The reaction mixture was gradually heated to 80° C. The reaction was run under nitrogen atmosphere at 80° C. for 16 hours, after which more than 95% conversion was obtained.

TABLE 1

Composition of Hydroxy Terminated Oligomers (HTO)

| Oligomer | Composition | Molar Ratio |
| --- | --- | --- |
| HTO-1 | MEFOSEA/RSH | 4/1 |
| HTO-2 | MEFOSEA/RSH | 8/1 |
| HTO-3 | (HOEMA$^1$/IPDI$^1$/BO$^1$)/BA/RSH | 1/3/1 |
| HTO-4 | BA/DIAA/RSH | 4/1/1 |
| HTO-5 | BA/DIAA/RSH | 3/0.5/1 |
| HTO-6 | (HOEMA/IPDI/BO)/BA/RSH | 3.5/0.5/1 |
| HTO-7 | BA/GMA/RSH | 4/1/1 |

B. Synthesis of fluorochemical compounds (FC)

Several of the fluorochemical compounds given in Table 2 were prepared using a procedure similar to the synthesis of Desmodur W/HTO-1/PEG$^{1450}$ (molar ratio 3/2/2) (FC-11 in Table 2):

A round bottom flask equipped with a condensor, thermometer, stirrer and nitrogen inlet was charged with 7.86 g (0.03 moles)Desmodur W, 29 g (0.02 moles) $PEG^{1450}$, 82.2 g (0.02 moles, 60% solids solution) HTO-1 and 167 g ethyl acetate. The reaction mixture was heated to 50° C. after which catalyst was added (TEA/SN-octanoate, available from Witco as Formez C-2). The temperature of the mixture was raised to 75° C. and the reaction was run until completion.

C. Emulsification

The fluorochemical compound obtained in step B (20 g solids) was added to deionized water containing 1.2 g Arquad T-50 (50% solids) emulsifier. The mixture was homogenized using an ultrasonic probe (Branson 250 sonifier) after which the organic solvent was removed under vacuum. An emulsion containing 15% fluorochemical compound was obtained.

TABLE 2

Composition of Fluorochemical Urethanes (FC)

| FC | Composition of Fluorochemical Compound | Molar Ratio |
|---|---|---|
| FC-1 | DESN/HTO-1/HTO-3/$PEG^{1000}$ | 2/2/2/1 |
| FC-2 | DESN/HTO-1/HTO-3/$PEG^{1450}$ | 2/2/2/1 |
| FC-3 | DESN/HTO-1/HTO-3/$PEG^{2000}$ | 2/2/2/1 |
| FC-4 | DESN/HTO-1/HTO-3/$PEG^{1450}$ | 3/2/3/2 |
| FC-5 | DESN/HTO-2/HTO-3/$PEG^{1450}$ | 3/2/3/2 |
| FC-6 | DESN/HTO-1/HTO-7/$PEG^{1000}$ | 2/2/2/1 |
| FC-7 | DESN/HTO-1/HTO-4/$PEG^{1000}$ | 2/2/2/1 |
| FC-8 | DESN/HTO-1/HTO-5/$PEG^{1000}$ | 2/2/2/1 |
| FC-9 | DESN/HTO-1/HTO-6/$PEG^{1000}$ | 2/2/2/1 |
| FC-10 | DESL/HTO-1/$PEG^{1450}$/BO | 3/2/2/3 |
| FC-11 | DESW/HTO-1/$PEG^{1450}$ | 3/2/2 |
| FC-12 | DESW/HTO-1/$PEG^{1000}$ | 3/2/2 |
| FC-13 | DESW/HTO-1/$PEG^{800}$ | 3/2/2 |
| FC-14 | DESW/HTO-2/$PEG^{1000}$ | 3/2/2 |
| FC-15 | DESW/HTO-2/$PEG^{4000}$ | 3/2/2 |
| FC-16 | DESW/HTO-1/$PEG^{4000}$ | 3/2/2 |
| FC-17 | DESW/HTO-1/$PEG^{8000}$ | 4/2/3 |
| FC-18 | DESW/HTO-1/$PEG^{4000}$ | 4/2/3 |
| FC-19 | DESW/HTO-1/$PEG^{1000}$ | 6/2/5 |
| FC-20 | DESW/HTO-1/HTO-3/$PEG^{1450}$ | 3/1.5/0.5/2 |
| FC-21 | DESW/HTO-1/HTO-3/$PEG^{1000}$ | 3/1.5/0.5/2 |
| FC-22 | DESW/HTO-1/HTO-7/$PEG^{1000}$ | 3/1.5/0.5/2 |
| FC-23 | DESW/HTO-2/HTO-3/$PEG^{1000}$ | 3/1.5/0.5/2 |
| FC-24 | DESW/HTO-2/HTO-7/$PEG^{1000}$ | 3/1.5/0.5/2 |
| FC-25 | DESW/HTO-2/HTO-3/$PEG^{2000}$ | 3/1.5/0.5/2 |
| FC-26 | DESW/HTO-2/HTO-7/$PEG^{2000}$ | 3/1.5/0.5/2 |

Examples 1 to 7 and Comparative Example C-1

In Examples 1 to 7, fluorochemical compounds according to the invention were prepared and emulsified following the general procedure described above. Polyester/cotton (PES/CO) blends were treated with the fluorochemical compounds so as to give 0.3 or 0.6% SOF. After treatment, the fabrics were dried at 150° C. for 3 minutes. The treated PES/CO substrates were stained with dirty motor oil using the drop method. Comparative Example C-1 was made with untreated PES/CO fabric. The results for stain release and oil and water repellency are given in Table 3.

TABLE 3

Stain Release (DMO-Drop) and Repellency Properties of Treated PES/CO

| Ex No | Fluoro-chemical Compound | % SOF | Initial Performance OR | Initial Performance WR | Stain Release Color Measurement $\Delta L_{IN}$ | Stain Release Color Measurement $\Delta L_{LD70°C.}$ | % $\Delta\Delta L$ |
|---|---|---|---|---|---|---|---|
| 1 | FC-1 | 0.3 | 5 | 8 | −5.88 | −1.07 | 82 |
| 2 | FC-6 | 0.6 | 6 | 8 | −13.74 | −8.35 | 39 |
| 3 | FC-7 | 0.6 | 6 | 10 | −3.26 | −1.23 | 62 |
| 4 | FC-8 | 0.6 | 6 | 10 | −6.48 | −2.38 | 63 |
| 5 | FC-9 | 0.3 | 4 | 5 | −12.32 | −6.7 | 46 |
| 6 | FC-10 | 0.6 | 5 | 4 | −7.35 | −3.27 | 56 |
| 7 | FC-11 | 0.3 | 5 | 6 | −5.63 | −0.19 | 97 |
| C-1 | — | — | 0 | 0 | −15.45 | −9.56 | 38 |

The results show that all fluorochemical compounds according to the invention provided good to very good DMO stain release. In some cases (e.g., Example 7), no visible stain remained on the substrate after laundering. Furthermore, the fluorochemical compounds of the present invention not only provided the substrate with good stain release, but also with good to high oil and water repellency which presents a further advantage.

Examples 8 to 27 and Comparative Example C-2

In Examples 8 to 27, the same type of experiment was repeated but this time the DMO was applied to the fabric by the brush method. Comparative Example C-2 was made with untreated PES/CO fabric. The results of stain release and oil and water repellency are given in Table 4.

TABLE 4

Stain Release (DMO-Brush Method) and Repellent Properties of Treated PES/CO

| Ex No | Fluoro-chemical Compound | % SOF | Initial Performance OR | Initial Performance WR | Stain Release Color Measurement $\Delta L_{IN}$ | Stain Release Color Measurement $\Delta L_{LD70°C.}$ | % $\Delta\Delta L$ |
|---|---|---|---|---|---|---|---|
| 8 | FC-2 | 0.6 | 6 | 10 | −18.31 | −7.86 | 57 |
| 9 | FC-3 | 0.3 | 6 | 10 | −18.30 | −9.02 | 51 |
| 10 | FC-4 | 0.3 | 5 | 9 | −18.52 | −9.38 | 49 |
| 11 | FC-5 | 0.3 | 5 | 6 | −18.89 | −10.17 | 46 |
| 12 | FC-1I | 0.6 | 6 | 10 | −18.4 | −5.56 | 70 |
| 13 | FC-12 | 0.3 | 6 | 8 | −18.53 | −5.46 | 71 |
| 14 | FC-13 | 0.6 | 6 | 9 | −18.35 | −6.09 | 67 |
| 15 | FC-14 | 0.6 | 6 | 4 | −18.36 | −6.59 | 64 |
| 16 | FC-15 | 0.3 | 1 | 2 | −17.26 | −7.45 | 57 |
| 17 | FC-16 | 0.3 | 2 | 3 | −17.27 | −9.35 | 46 |
| 18 | FC-17 | 0.3 | 1 | 0 | −17.06 | −10 | 41 |
| 19 | FC-18 | 0.6 | 4 | 1 | −17.95 | −8.36 | 53 |
| 20 | FC-19 | 0.3 | 5 | 5 | −18.84 | −6 | 68 |
| 21 | FC-20 | 0.3 | 3 | 5 | −18.51 | −8.3 | 55 |
| 22 | FC-21 | 0.6 | 6 | 10 | −17.81 | −7.06 | 60 |
| 23 | FC-22 | 0.6 | 6 | 10 | −18.64 | −4.07 | 78 |
| 24 | FC-23 | 0.3 | 5 | 5 | −18.57 | −7.12 | 62 |
| 25 | FC-24 | 0.3 | 5 | 4 | −18.53 | −7.08 | 62 |
| 26 | FC-25 | 0.3 | 2 | 2 | −17.92 | −7.59 | 58 |
| 27 | FC-26 | 0.3 | 1 | 1 | −17.55 | −7.7 | 56 |
| C-2 | — | — | 0 | 0 | −15.32 | −8.67 | 43 |

The results indicate that even in the more severe brush method, good DMO stain release was observed with treated fabric.

Examples 28 to 47 and Comparative Example C-3

In Examples 28 to 47, the same type of experiment as above was repeated with 100% cotton substrates treated with the fluorochemical compositions. According to the general procedure described above, DMO stain was applied to the cotton using the brush method. Comparative Example C-3 was made with untreated cotton fabric. The results of stain release and oil and water repellency are given in Table 5.

TABLE 5

Stain Release (DMO-Brush Method) and Repellent Properties of Treated Cotton

| Ex No | Fluoro-chemical Compound | % SOF | Initial Performance OR | WR | $\Delta L_{IN}$ | Stain Release Color Measurement $\Delta L_{LD70°C.}$ | % $\Delta\Delta L$ |
|---|---|---|---|---|---|---|---|
| 28 | FC-2 | 0.3 | 4 | 6 | −19.55 | −8.33 | 57 |
| 29 | FC-3 | 0.3 | 3 | 6 | −18.83 | −8.71 | 54 |
| 30 | FC-4 | 0.3 | 3 | 6 | −19.65 | −8.56 | 56 |
| 31 | FC-5 | 0.3 | 2 | 3 | −19.37 | −8.76 | 55 |
| 32 | FC-11 | 0.6 | 4 | 4 | −18.57 | −8.74 | 53 |
| 33 | FC-12 | 0.6 | 4 | 3 | −18.68 | −5.14 | 72 |
| 34 | FC-13 | 0.6 | 6 | 7 | −18.89 | −5.74 | 70 |
| 35 | FC-14 | 0.6 | 5 | 4 | −18.73 | −4.26 | 77 |
| 36 | FC-15 | 0.6 | 2 | 1 | −19.65 | −8.34 | 58 |
| 37 | FC-16 | 0.6 | 1 | 1 | −18.25 | −8.64 | 53 |
| 38 | FC-17 | 0.6 | 2 | 2 | −18.03 | −8.85 | 51 |
| 39 | FC-18 | 0.6 | 2 | 1 | −17.66 | −8.78 | 50 |
| 40 | FC-19 | 0.6 | 3 | 2 | −18.59 | −9.03 | 51 |
| 41 | FC-20 | 0.6 | 3 | 4 | −19.28 | −8.37 | 57 |
| 42 | FC-21 | 0.6 | 4 | 5 | −18.87 | −7.46 | 60 |
| 43 | FC-22 | 0.6 | 5 | 7 | −19.11 | −4.04 | 79 |
| 44 | FC-23 | 0.6 | 4 | 2 | −19.18 | −7.53 | 61 |
| 45 | FC-24 | 0.6 | 3 | 3 | −19.12 | −7.37 | 61 |
| 46 | FC-25 | 0.6 | 2 | 1 | −19.35 | −8.25 | 57 |
| 47 | FC-26 | 0.6 | 2 | 1 | −19.42 | −8.45 | 56 |
| C-3 | — | — | 0 | 0 | −15.70 | −8.76 | 44 |

Even on cotton substrates, good percentage of stain removal (%$\Delta\Delta L$) was observed for oily stains such as DMO.

Examples 48 to 54 and Comparative Example C-4

In Examples 48 to 54, PES/CO blends treated with the fluorochemical compounds according to the invention were stained with tea using the drop method. Comparative Example C-4 was made with untreated fabric. The results of stain release and oil and water repellency are given in Table 6.

TABLE 6

Stain Release (Tea-Drop Method) and Repellent Properties of Treated PES/CO

| Ex No | Fluorochemical Compound | % SOF | Initial Performance OR | WR | $\Delta L_{IN}$ | Stain Release Color Measurement $\Delta L_{LD70°C.}$ | % $\Delta\Delta L$ |
|---|---|---|---|---|---|---|---|
| 48 | FC-1 | 0.6 | 6 | 9 | −5.89 | −0.81 | 86 |
| 49 | FC-6 | 0.6 | 6 | 8 | −5.82 | −0.72 | 88 |
| 50 | FC-7 | 0.6 | 6 | 10 | −4.96 | −0.41 | 92 |
| 51 | FC-8 | 0.6 | 6 | 10 | −6.3 | −0.46 | 93 |
| 52 | FC-9 | 0.6 | 5 | 7 | −6.93 | −0.99 | 86 |
| 53 | FC-10 | 0.3 | 3 | 4 | −6.35 | −0.97 | 85 |
| 54 | FC-11 | 0.6 | 5 | 7 | −8.84 | −0.99 | 89 |
| C-4 | — | — | 0 | 0 | −2.32 | −0.91 | 61 |

A high percentage of tea stain removal was observed.

Examples 55 to 74 and Comparative Example C-5

In Examples 55 to 74, PES/CO substrates treated with the fluorochemical compounds according to the invention were tested with tea stains, using the brush method. Comparative Example C-5 was made with untreated material. The results of stain release and oil and water repellency are given in Table 7.

TABLE 7

Stain Release (Tea-Brush Method) and Repellent Properties of Treated PES/CO

| Ex No | Fluorochemical Compound | % SOF | Initial Performance OR | WR | $\Delta L_{IN}$ | Stain Release Color Measurement $\Delta L_{LD70°C.}$ | % $\Delta\Delta L$ |
|---|---|---|---|---|---|---|---|
| 55 | FC-2 | 0.6 | 6 | 10 | −1.32 | −0.77 | 42 |
| 56 | FC-3 | 0.6 | 6 | 10 | −1.6 | −1 | 38 |
| 57 | FC-4 | 0.3 | 5 | 9 | −2.65 | −1.1 | 58 |
| 58 | FC-5 | 0.6 | 5 | 8 | −1.87 | −1.02 | 45 |
| 59 | FC-11 | 0.6 | 6 | 10 | −1.38 | −0.55 | 60 |
| 60 | FC-12 | 0.6 | 6 | 8 | −1.66 | −0.79 | 52 |
| 61 | FC-13 | 0.6 | 6 | 9 | −1.5 | −0.77 | 49 |
| 62 | FC-14 | 0.6 | 6 | 4 | −1.52 | −0.83 | 45 |
| 63 | FC-15 | 0.6 | 3 | 3 | −1.87 | −0.78 | 58 |
| 64 | FC-16 | 0.6 | 5 | 3 | −2.45 | −0.83 | 66 |
| 65 | FC-17 | 0.6 | 4 | 1 | −2.49 | −0.82 | 67 |
| 66 | FC-18 | 0.6 | 4 | 1 | −2.27 | −0.68 | 70 |
| 67 | FC-19 | 0.6 | 6 | 5 | −2.31 | −0.47 | 80 |
| 68 | FC-20 | 0.6 | 4 | 5 | −1.54 | −0.64 | 58 |
| 69 | FC-21 | 0.6 | 6 | 10 | −1.56 | −0.67 | 57 |
| 70 | FC-22 | 0.6 | 6 | 10 | −1.81 | −0.82 | 55 |
| 71 | FC-23 | 0.6 | 6 | 5 | −1.76 | −1.05 | 40 |
| 72 | FC-24 | 0.6 | 5 | 5 | −1.79 | −0.98 | 45 |
| 73 | FC-25 | 0.6 | 3 | 4 | −2.48 | −0.95 | 62 |
| 74 | FC-26 | 0.6 | 2 | 4 | −2.18 | −0.8 | 63 |
| C-5 | — | — | 0 | 0 | −2.62 | −1.22 | 53 |

Although in some cases the percentage stain removal for the tea stain on treated substrates was not much better or even inferior than the untreated samples, all treated samples showed a much less negative value for $\Delta L_{LD70° C.}$ than the untreaed sample. This indicates that the stain remaining on treated substrate was less visible after laundering.

Examples 75 to 94 and Comparative Example C-6

In Examples 75 to 94, treated cotton substrates were stained with tea using the brush method. Comparative Example C-6 was made with untreated material. The results of stain release and oil and water repellency are given in Table 8.

TABLE 8

Stain Release (Tea-Brush Method) and Repellent Properties of Treated Cotton

| Ex No | Fluorochemical Compound | % SOF | Initial Performance OR | WR | $\Delta L_{IN}$ | Stain Release Color Measurement $\Delta L_{LD70°C.}$ | % $\Delta\Delta L$ |
|---|---|---|---|---|---|---|---|
| 75 | FC-2 | 0.3 | 4 | 6 | −2.33 | −0.66 | 72 |
| 76 | FC-3 | 0.3 | 3 | 6 | −2.52 | −0.42 | 83 |
| 77 | FC-4 | 0.3 | 3 | 6 | −2.17 | −0.72 | 67 |
| 78 | FC-5 | 0.3 | 2 | 3 | −2.38 | −0.89 | 63 |
| 79 | FC-11 | 0.6 | 4 | 4 | −2.02 | −0.36 | 82 |
| 80 | FC-12 | 0.6 | 4 | 3 | −2.06 | −0.39 | 81 |
| 81 | FC-13 | 0.6 | 6 | 7 | −2.41 | −0.39 | 84 |
| 82 | FC-14 | 0.6 | 5 | 4 | −2.5 | −0.6 | 76 |
| 83 | FC-15 | 0.6 | 2 | 1 | −2.93 | −0.78 | 73 |
| 84 | FC-16 | 0.6 | 1 | 1 | −2.66 | −0.92 | 65 |
| 85 | FC-17 | 0.6 | 2 | 2 | −2.52 | −1.06 | 58 |
| 86 | FC-18 | 0.6 | 2 | 1 | −2.64 | −0.97 | 63 |
| 87 | FC-19 | 0.6 | 3 | 2 | −2.05 | −0.58 | 72 |
| 88 | FC-20 | 0.6 | 3 | 4 | −2.82 | −0.6 | 79 |
| 89 | FC-21 | 0.6 | 4 | 5 | −2.3 | −0.36 | 84 |
| 90 | FC-22 | 0.6 | 5 | 7 | −2.52 | −0.43 | 83 |
| 91 | FC-23 | 0.6 | 4 | 2 | −2.84 | −0.47 | 83 |

TABLE 8-continued

Stain Release (Tea-Brush Method) and Repellent Properties of Treated Cotton

| Ex No | Fluorochemical Compound | % SOF | Initial Performance OR | WR | Stain Release Color Measurement $\Delta L_{IN}$ | $\Delta L_{LD70°C}$ | % $\Delta\Delta L$ |
|---|---|---|---|---|---|---|---|
| 92 | FC-24 | 0.6 | 3 | 3 | −2.43 | −0.42 | 83 |
| 93 | FC-25 | 0.6 | 2 | 1 | −3.03 | −0.56 | 82 |
| 94 | FC-26 | 0.6 | 2 | 1 | −3.03 | −0.63 | 79 |
| C-6 | — | — | 0 | 0 | −3.21 | −1.36 | 58 |

The results show that cotton fabric treated with the fluorochemical compounds of the invention showed high tea stain removal. Also medium to high water and oil repellency properties were obtained.

Examples 95 to 103 and Comparative Example C-7

Examples 95 to 103, PES/CO substrate was treated with fluorochemical compound FC-19 (Example 95) or with a 50/50 blend of FC-19 with the polyvinyl alcohols listed in Table 9 (Examples 96 to 103). The substrate was treated in such a way as to have 0.6% SOF fluorochemical compound and 0.6% SOF polyvinyl alcohol (except Example 95). Comparative Example C-7 was made using untreated PES/CO. The treated and untreated substrates were stained with DMO (brush method) and tested for their stain release and repellency properties. The results are given in Table 9.

TABLE 9

Stain Release for DMO Stains

| Ex No | PVA | Initial Performance OR | WR | Stain Release Color Measurement* $\Delta L_{IN}$ | $\Delta L_{LD70°C}$ | % $\Delta\Delta L$ |
|---|---|---|---|---|---|---|
| 95 | — | 6 | 1 | −55.8 | −6.6 | 88 |
| 96 | Mowiol ™ 3-83 | 6 | 1 | −58.4 | −4.2 | 93 |
| 97 | Mowiol ™ 3-98 | 6 | 1 | −59.7 | −8.0 | 87 |
| 98 | Mowiol ™ 10-74 | 6 | 1 | −59.3 | −4.5 | 92 |
| 99 | Mowiol ™ 5-88 | 6 | 1 | −58.8 | −5.9 | 90 |
| 100 | Mowiol ™ 15-79 | 6 | 1 | −59.5 | −5.8 | 90 |
| 101 | Mowiol ™ 18-88 | 6 | 1 | −59.3 | −5.2 | 91 |
| 102 | Mowiol ™ 26-88 | 6 | 1 | −59.8 | −3.4 | 94 |
| 103 | Mowiol ™ 40-88 | 6 | 1 | −59.2 | −4.8 | 92 |
| C-7 | — | 0 | 0 | −45.0 | −21.9 | 51 |

Note:
*lens opening of the Minolta colorimeter was set at 53 mm

The data shows that the high stain release properties provided by the fluorochemical compositions can improved by the addition of polyvinyl alcohol without sacrificing oil and water repellent properties. The influence of polyvinyl alcohol is reflected by a less negative $\Delta L_{LD70°\ C.}$ value, indicating better stain release properties.

Examples 104 to 115 and Comparative Examples C-8 and C-9

In Examples 104 to 115, PES/CO substrate was treated with fluorochemical compound FC-19 at various add-on levels with and without the addition of Mowiol™ 3-83 as described in Table 10. Comparative Example C-8 was made using untreated substrate and Comparative Example C-9 was made with PES/CO substrate treated with Mowiol™ 3-83 alone (1% SOF). The treated and untreated substrates were stained with DMO (brush) and tested for their stain release and oil and water repellency properties. The results are given in Table 10.

TABLE 10

| Ex No | % FC-19 | % Mowiol ™ 3-83 | Initial Performance OR | WR | Stain Release Color Measurement* $\Delta L_{IN}$ | $\Delta L_{LD70°C.}$ | % $\Delta\Delta L$ |
|---|---|---|---|---|---|---|---|
| 104 | 0.6 | — | 6 | 0 | −16.9 | −1.5 | 91 |
| 105 | 0.6 | 1.0 | 6 | 4 | −16.5 | −0.4 | 98 |
| 106 | 0.6 | 0.6 | 6 | 1 | −16.7 | −0.8 | 95 |
| 107 | 0.6 | 0.4 | 6 | 3 | −16.8 | −1.6 | 90 |
| 108 | 0.4 | — | 6 | 4 | −17.0 | −2.3 | 87 |
| 109 | 0.4 | 1.0 | 6 | 0 | −16.6 | −0.8 | 95 |
| 110 | 0.4 | 0.6 | 6 | 0 | −17.0 | −1.9 | 89 |
| 111 | 0.4 | 0.4 | 6 | 0 | −16.7 | −0.7 | 96 |
| 112 | 0.3 | — | 5 | 1 | −17.2 | −3.6 | 79 |
| 113 | 0.3 | 1.0 | 5 | 1 | −16.3 | −1.7 | 90 |
| 114 | 0.3 | 0.6 | 5 | 0 | −16.6 | −1.0 | 94 |
| 115 | 0.3 | 0.4 | 5 | 0 | −17.0 | −2.2 | 87 |
| C-8 | — | — | 0 | 0 | −14.2 | −8.5 | 40 |
| C-9 | — | 1.0 | 0 | 0 | −15.1 | −5.8 | 62 |

Note:
*lens opening of the Minolta colorimeter was set at 53 mm

The results demonstrate that addition of polyvinyl alcohol to the fluorochemical composition improves the stain release performance. Additionally, it can be seen that part of the fluorochemical treating agent can be replaced by polyvinyl alcohol while maintaining the high level of stain release properties.

Examples 116 to 125 and Comparative Example C-10

In Examples 116 to 125, PES/CO substrate was treated with fluorochemical compound FC-19 (Example 116) or with a 50/50 blend of FC-19 with various Polyvinyl™ type polyvinyl alcohols (Examples 117 to 125). The substrate was treated in such a way as to have 0.6% SOF fluorochemical compound and 0.6% SOF polyvinyl alcohol. Comparative Example C-10 was made using untreated PES/CO. The treated and untreated substrates were stained with DMO (brush) and tested for their stain release and repellency properties. The results are given in Table 11.

TABLE 11

| Ex No | Polyviol ™ | Initial Performance OR | WR | Stain Release Color Measurement* $\Delta L_{IN}$ | $\Delta L_{LD70°C.}$ | % $\Delta\Delta L$ |
|---|---|---|---|---|---|---|
| 116 | — | 6 | 1 | −55.8 | −6.6 | 88 |
| 117 | V03/240 | 6 | 0 | −59.9 | −2.8 | 95 |
| 118 | V03/180 | 6 | 0 | −58.9 | −4.2 | 93 |
| 119 | V03/140 | 6 | 1 | −58.6 | −2.9 | 95 |
| 120 | G04/20 | 6 | 0 | −58.8 | −5.1 | 91 |
| 121 | M05/290 | 6 | 2 | −56.9 | −5.4 | 90 |
| 122 | M05/140 | 6 | 0 | −59.9 | −3.1 | 95 |
| 123 | W25/190 | 6 | 0 | −57.7 | −2.5 | 96 |
| 124 | W25/100 | 6 | 0 | −59.1 | −3.0 | 95 |
| 125 | W45/450** | 6 | 2 | −59.2 | −4.7 | 92 |
| C-10 | — | 0 | 0 | −45.0 | −21.9 | 51 |

Note:
*lens opening of Minolta colorimeter was set at 53 mm
**Polyviol ™ W45/450 was not soluble in water and had to be dissolved in IPA/Water 1/1

In this case, the same observations were made as with the Mowiol™ type polyvinyl alcohols.

Examples 126 to 137 and Comparative Examples C-11 and C-12

In Examples 126 to 137, PES/CO substrate was treated with fluorochemical compound FC-19 or with a 50/50 blend of FC-19 with polyvinyl alcohol, as given in Table 12. The substrate was treated in such a way as to have 0.6% SOF fluorochemical compound or 0.6% SOF fluorochemical compound and 0.6% SOF polyvinyl alcohol. Comparative Examples C-11 and C-12 were made using untreated PES/CO. The treated and untreated substrates were stained with tea or wine and tested for their stain release and repellency properties. The results are give in Table 12.

TABLE 12

| Ex No | Polyvinylalcohol | Initial Performance | | Stain Release Performance* | | |
|---|---|---|---|---|---|---|
| | | OR | WR | $\Delta L_{IN}$ | $\Delta L_{LD70°C}$ | % $\Delta\Delta L$ |
| Stain: TEA | | | | | | |
| 126 | — | 6 | 1 | −6.8 | −1.7 | 75 |
| 127 | Mowiol ™ 3-83 | 6 | 1 | −6.5 | −1.6 | 75 |
| 128 | Mowiol ™ 5-88 | 6 | 0 | −7.1 | −1.7 | 76 |
| 129 | Airvol ™ 165 | 1 | 0 | −6.7 | −1.2 | 82 |
| 130 | Polyviol ™ V03/180 | 6 | 1 | −6.6 | −1.5 | 77 |
| 131 | Polyviol ™ W25/190 | 6 | 4 | −6.9 | −1.8 | 75 |
| C-11 | — | 0 | 0 | −6.3 | −3.4 | 46 |
| Stain: WINE | | | | | | |
| 132 | — | 6 | 1 | −14.7 | −1.7 | 89 |
| 133 | Mowiol ™ 3-83 | 6 | 1 | −14.1 | −1.6 | 88 |
| 134 | Mowiol ™ 5-88 | 6 | 0 | −15.3 | −1.5 | 90 |
| 135 | Airvol ™ 165 | 1 | 0 | −13.3 | −0.7 | 95 |
| 136 | Polyviol ™ V03/180 | 6 | 1 | −15.1 | −1.3 | 91 |
| 137 | Polyviol ™ W25/190 | 6 | 4 | −16.7 | −1.8 | 89 |
| C-12 | — | 0 | 0 | −13.4 | −3.5 | 74 |

Note:
*lens opening of the Minolta colorimeter was set at 53 mm instead of 18 mm The results in Table 12 show that, in some cases, the addition of a polyvinyl alcohol the fluorochemical composition of the invention results in a slightly improved stain release performance with respect to aqueous based stains such as tea and wine.

Examples 138 to 145

In Examples 138 to 145, PES/CO substrate was treated with fluorochemical compounds FC-13 or FC-16 or with a 50/50 blend of the fluorochemical compound and polyvinyl alcohol Mowiol™ 3-83. The substrate was treated in such a way as to have 0.6% fluorochemical compound and 0.6% SOF polyvinyl alcohol. The treated substrates were stained with tea or DMO (brush) and tested for their stain release and oil and water repellency properties. The results are given in Table 13.

TABLE 13

| | | | Stain Release For Tea and DMO Stains | | | | |
|---|---|---|---|---|---|---|---|
| Ex No | FC Compound | PVA | Initial Performance | | Stain Release Color Measurement | | |
| | | | OR | WR | $\Delta L_{IN}$ | $\Delta L_{LD70°C}$ | % $\Delta\Delta L$ |
| Stain: TEA | | | | | | | |
| 138 | FC-13 | — | 6 | 0 | −2.5 | −0.9 | 65 |
| 139 | FC-13 | Mowiol ™ 3-83 | 6 | 0 | −2.6 | −0.7 | 75 |
| 140 | FC-16 | — | 4 | 0 | −2.2 | −0.5 | 79 |
| 141 | FC-16 | Mowiol ™ 3-83 | 4 | 0 | −2.1 | −0.5 | 78 |

TABLE 13-continued

| | | | Stain Release For Tea and DMO Stains | | | | |
|---|---|---|---|---|---|---|---|
| Ex No | FC Compound | PVA | Initial Performance | | Stain Release Color Measurement | | |
| | | | OR | WR | $\Delta L_{IN}$ | $\Delta L_{LD70°C}$ | % $\Delta\Delta L$ |
| Stain: DMO | | | | | | | |
| 142 | FC-13 | — | 6 | 0 | −16.7 | −5.6 | 67 |
| 143 | FC-13 | Mowiol ™ 3-83 | 6 | 0 | −16.4 | −3.1 | 81 |
| 144 | FC-16 | — | 4 | 0 | −17.8 | −8.3 | 53 |
| 145 | FC-16 | Mowiol ™ 3-83 | 4 | 0 | −17.5 | −0.9 | 61 |

Also in this case, improved stain release performance were obtained by blending polyvinyl alcohol with the fluorochemical compound especially for DMO stains.

Examples 146 to 167

Examples 146 to 167, PES/CO substrate was treated with fluorochemical compounds FC-13, FC-16 or FC-19 or with a 50/50 blend of the fluorochemical compound with cellulose derivatives, as given in Table 14. The substrate was treated in such a way as to have 0.6% SOF fluorochemical compound or 0.6% SOF fluorochemical compound and 0.6% SOF cellulose derivative. The treated substrates were stained with tea or DMO (brush) and tested for their stain release and repellency properties. The results are given in Table 14.

TABLE 14

| Ex No | FC Compound | Cellulose Derivative | Initial Performance | | Stain Release Color Measurement | | |
|---|---|---|---|---|---|---|---|
| | | | OR | WR | $\Delta L_{IN}$ | $\Delta L_{LD70°C}$ | % $\Delta\Delta L$ |
| Stain: DMO | | | | | | | |
| 146 | FC-13 | — | | | −16.7 | −5.6 | 67 |
| 147 | FC-13 | Culminal ™ MHPC 50 | 6 | 0 | −16.0 | −3.1 | 81 |
| 148 | FC-13 | Klucel ™ M | | | −16.4 | −3.8 | 77 |
| 149 | FC-16 | — | | | −17.8 | −8.3 | 53 |
| 150 | FC-16 | Culminal ™ MHPC 50 | 5 | 0 | −16.4 | −3.8 | 77 |
| 151 | FC-16 | Klucel ™ M | 4 | 1 | −16.4 | −2.8 | 83 |
| 152 | FC-19 | — | | | −17.1 | −2.3 | 87 |
| 153 | FC-19 | Culminal ™ MHPC 50 | 6 | 0 | −16.6 | −1.2 | 93 |
| 154 | FC-19 | Culminal ™ MC25 PF | 6 | 1 | −16.4 | −1.0 | 94 |
| 155 | FC-19 | Klucel ™ M | 6 | 1 | −16.9 | −1.4 | 92 |
| 156 | FC-19 | Klucel ™ E | 6 | 1 | −17.1 | −1.4 | 92 |
| 157 | FC-19 | Klucel ™ L | 6 | 1 | −17.2 | −1.5 | 91 |
| 158 | FC-19 | Nexton ™ D-1200 | 0 | 0 | −15.3 | −6.1 | 61 |
| 159 | FC-19 | Nexton ™ D-2500W | 3 | 0 | −16.3 | −5.3 | 68 |
| 160 | FC-19 | Blanose ™ CMC 7LD | 0 | 0 | −15.4 | −5.5 | 64 |
| 161 | FC-19 | Cellulose Gum 7L | 1 | 0 | −16.1 | −5.8 | 64 |
| Stain: TEA | | | | | | | |
| 162 | FC-13 | — | | | −2.5 | −0.9 | 65 |
| 163 | FC-13 | Culminal ™ MHPC 50 | 6 | 0 | −2.5 | #0.8 | 68 |

TABLE 14-continued

| Ex No | FC Compound | Cellulose Derivative | Initial Performance OR | Initial Performance WR | Stain Release Color Measurement $\Delta L_{IN}$ | Stain Release Color Measurement $\Delta L_{LD70°C}$ | % $\Delta\Delta L$ |
|---|---|---|---|---|---|---|---|
| 164 | FC-13 | Klucel ™ M | | | −2.8 | −1.1 | 60 |
| 165 | FC-16 | — | | | −2.2 | −0.5 | 79 |
| 166 | FC-16 | Culminal ™ MHPC 50 | 5 | 0 | −3.0 | −1.0 | 68 |
| 167 | FC-16 | Klucel ™ M | 4 | 1 | −3.0 | −1.0 | 68 |

The data shows that the addition of non-ionic cellulose ethers to the fluorochemical composition of the invention also improves the stain release performance of the fluorochemical composition. However, the non-ionic cellulose either NEXTON™, which is a hydrophobically modified cellulose ether, resulted in a decrease of the stain release performance. Also, the ionic cellulose derivatives resulted in a reduced stain release performance relative to a fluorochemical composition that did not include these ionic celluloses.

Examples 168 to 197

In Examples 168 to 197, PES/CO substrate was treated with fluorochenical compounds FC-13, FC-16 or FC-19 or with a 50/50 blend of the fluorochemical compound with polyethyleneglycol of various molecular weight, as given in Table 15. The fluorochemical compound and the polyethyleneglycol (when used) were applied at 0.6% SOF each. The treated substrates were stained with DMO or tea and tested for their stain release properties.

TABLE 15

| Ex No | FC | PEG | $\Delta L_{IN}$ | $\Delta L_{LD70°C}$ | % $\Delta\Delta L$ |
|---|---|---|---|---|---|
| Stain: DMO | | | | | |
| 168 | FC-13 | — | −58.4 | −13.6 | 77 |
| 169 | FC-13 | PEG 200 | −59.4 | −11.2 | 81 |
| 170 | FC-13 | PEG 1000 | −58.4 | −11.8 | 80 |
| 171 | FC-13 | PEG 2000 | −57.9 | −9.5 | 84 |
| 172 | FC-13 | PEG 4000 | −58.4 | −8.8 | 85 |
| 173 | FC-16 | — | −54.3 | −21.9 | 60 |
| 174 | FC-16 | PEG 200 | −56.6 | −21.9 | 61 |
| 175 | FC-16 | PEG 1000 | −56.8 | −19.7 | 65 |
| 176 | FC-16 | PEG 2000 | −55.1 | −20.7 | 62 |
| 177 | FC-16 | PEG 4000 | −56.2 | −20.6 | 63 |
| 178 | FC-19 | — | −52.3 | −6.9 | 87 |
| 179 | FC-19 | PEG 200 | −53.9 | −6.0 | 89 |
| 180 | FC-19 | PEG 1000 | −55.6 | −6.8 | 88 |
| 181 | FC-19 | PEG 2000 | −55.6 | −6.5 | 88 |
| 182 | FC-19 | PEG 4000 | −56.7 | −7.2 | 87 |
| Stain: TEA | | | | | |
| 183 | FC-13 | — | −6.5 | −2.9 | 55 |
| 184 | FC-13 | PEG 200 | −7.5 | −4.4 | 41 |
| 185 | FC-13 | PEG 1000 | −7.2 | −3.5 | 51 |
| 186 | FC-13 | PEG 2000 | −7.1 | −3.6 | 49 |
| 187 | FC-13 | PEG 4000 | −6.2 | −2.6 | 58 |
| 188 | FC-16 | — | −6.2 | −2.7 | 56 |
| 189 | FC-16 | PEG 200 | −5.9 | −2.7 | 54 |
| 190 | FC-16 | PEG 1000 | −5.8 | −2.5 | 57 |
| 191 | FC-16 | PEG 2000 | −5.8 | −2.7 | 53 |
| 192 | FC-16 | PEG 4000 | −5.4 | −2.4 | 56 |
| 193 | FC-19 | — | −6.6 | −1.9 | 71 |
| 194 | FC-19 | PEG 200 | −6.8 | −2.0 | 71 |
| 195 | FC-19 | PEG 1000 | −7.1 | −2.0 | 72 |

TABLE 15-continued

| Ex No | FC | PEG | $\Delta L_{IN}$ | $\Delta L_{LD70°C}$ | % $\Delta\Delta L$ |
|---|---|---|---|---|---|
| 196 | FC-19 | PEG 2000 | −7.3 | −2.2 | 70 |
| 197 | FC-19 | PEG 4000 | −5.6 | −2.2 | 61 |

Note:
*lens opening of the Minolta colorimeter was set at 53 mm

The results in Table 15 show that there is some improvement of the stain release performance of the fluorochemical composition when polyglycols are added to the fluorochemical composition.

What is claimed is:

1. A method for preparing a fluorochemical composition comprising a polyurethane by reacting:
(A) fluorochemical oligomer of formula (I)

$$M^f{}_m M_n{-}Q^1{-}T^1 \qquad (I)$$

wherein:
$M^f{}_m M_n$ represents fluorochemical oligomer comprising m units derived from fluorinated monomers and n units derived from fluorine-free monomers and wherein the fluorinated monomers and fluorine-free monomers may be the same or different;
m represents a value of 2 to 40;
n represents a value of 0 to 20;
$T^1$ is —OH or —NH$_2$;
$Q^1$ and $T^1$ together represent an organic residue obtained by removing a hydrogen atom from a chain transfer agent that is functionalized with $T^1$; and
(B) difunctional compound reactive with an isocyanate and comprising a poly(oxyalkylene)group having 18 to 280 oxyalkylene moieties; with
(C) diisocyanate or triisocyanate.

2. A method according to claim 1, wherein said method for preparing said fluorochemical composition further comprises reacting with an isocyanate blocking agent or a fluorine-free oligomer reactive with an isocyanate.

3. A method according to claim 1, wherein said fluorinated monomers correspond to the following formula:

$$R_f{-}L^1{-}E$$

wherein:
$R_f$ is selected from the group consisting of perfluorinated or partially fluorinated aliphatic groups;
$L^1$ represents an organic divalent linking group; and
E represents a free radical polymerizable group.

4. A method according to claim 3, wherein E is an acrylate or a methacrylate group and $L^1$ is selected from the group consisting of alkylenes, poly(oxyalkylenes) having 1 to 4 oxyalkylene moieties, and organic divalent linking groups according to the following formula:

$$\mathrm{-SO_2N(R^4){-}R^3{-}}$$

wherein:
$R^3$ is selected from the group consisting of linear or branched alkylenes having 2 to 4 carbon atoms; and
$R^4$ represents an alkyl group having 1 to 4 carbon atoms.

5. A method according to claim 1, wherein $Q^1$ corresponds to the formula:

$$-S-R-$$

wherein:

R represents an organic divalent linking group selected from the group consisting of linear or branched alkylenes, cyclic alkylenes and arylenes.

6. A method according to claim 1, wherein said difunctional compound used to prepare said fluorochemical composition corresponds to the following formula:

$$H-W^1-R^6-(O-R^7)_i-(O-R^8)_j-W^2-H$$

wherein:

$R^6$ is selected from the group consisting of linear or branched alkylenes having 1 to 4 carbon atoms;

$R^7$ and $R^8$ are each independently selected from the group consisting of linear or branched alkylenes having 2 to 4 carbon atoms;

$W^1$ is selected from the group consisting of O, S and NH;

$W^2$ is selected from the group consisting of O, S and NH;

i is an integer of 0 to 150;

j is an integer of 0 to 150; and i+j is at least 8.

7. A fluorochemical composition obtained by the method of claim 1.

8. A fluorochemical composition comprising: (i) polyurethane obtained by reacting:

(A) fluorochemical oligomer of formula (I)

$$M^f_m M_n - Q^1 - T^1 \qquad (I)$$

wherein:

$M^f_m M_n$ represents a fluorochemical oligomer comprising m units derived from fluorinated monomers and n units derived from fluorine-free monomers and wherein the fluorinated monomers and fluorine-free monomers may be the same or different;

m represents a value of 2 to 40;

n represents a value of 0 to 20;

$T^1$ is —OH or —NH$_2$;

$Q^1$ and $T^1$ together represent an organic residue obtained by removing a hydrogen atom from a chain transfer agent that is functionalized with $T^1$; and (B) difunctional compound reactive with an isocyanate and comprising a poly(oxyalkylene)group; with (C) diisocyanate or triisocyanate; and (ii) polymer selected from the group consisting of polyvinyl alcohols, copolymers of (meth)acrylic acid and alkyl esters of (meth)acrylic acid, polyethylene glycols, and non-ionic cellulose ethers wherein the ratio of said polyurethane (i) to said polymer (ii) is from 1:0.6 to 1:2.5.

9. A fluorochemical composition according to claim 8, wherein said reaction further comprises the step of reacting with an isocyanate blocking agent or a fluorine-free oligomer reactive with an isocyanate.

10. A fluorochemical composition according to claim 8, wherein said difunctional compound corresponds to the following formula:

$$H-W^1-R^6-(O-R^7)_i-(O-R^8)_j-W^2-H$$

wherein:

$R^6$ is selected from the group consisting of linear or branched alkylenes having 1 to 4 carbon atoms;

$R^7$ and $R^8$ are each independently selected from the group consisting of linear or branched alkylenes having 2 to 4 carbon atoms;

$W^1$ is selected from the group consisting of O, S and NH;

$W^2$ is selected from the group consisting of O, S and NH;

i is an integer of 0 to 150;

j is an integer of 0 to 150; and i+j is at least 8.

11. A method of treatment of a substrate comprising the step of contacting said substrate with a fluorochemical composition according to claim 7.

12. A substrate comprising on at least part of at least one surface a fluorochemical composition according to claim 7.

13. The method of claim 11 wherein said fluorochemical composition comprises a polyurethane obtained by reacting:

(A) fluorochemical oligomer of formula (I)

$$M^f_m M_n - Q^1 - T^1 \qquad (I)$$

wherein:

$M^f_m M_n$ represents fluorochemical oligomer comprising m units derived from fluorinated monomers and n units derived from fluorine-free monomers and wherein the fluorinated monomers and fluorine-free monomers may be the same or different;

m represents a value of 2 to 40;

n represents a value of 0 to 20;

$T^1$ is —OH or —NH$_2$;

$Q^1$ and $T^1$ together represent an organic residue obtained by removing a hydrogen atom from a chain transfer agent that is functionalized with $T^1$; and (B) difunctional compound capable of reacting with an isocyanate and comprising a poly(oxyalkylene)group; with (C) diisocyanate or triisocyanate.

14. The method of claim 11 wherein said substrate is a fibrous substrate.

15. The method of claim 14 wherein said substrate comprises natural fibers.

16. The method of claim 14 wherein said substrate is fibrous and said fibers are selected from the group consisting of cellulose fibers, polyester fibers and blends thereof.

17. The method of claim 16, wherein said fluorochemical composition is used in amounts sufficient to provide 0.01 to 5 weight percent of said fluorochemical composition on said substrate.

18. An emulsion comprising the composition of claim 7 further comprising water, and a surfactant in an amount sufficient to stabilize the emulsion.

19. The emulsion of claim 8, comprising 100 parts by weight fluorochemical composition, 70 to 2000 parts by weight water and 1 to 25 parts by weight surfactant.

* * * * *

UNITED STATES PATENT AND TRADEMARK OFFICE
CERTIFICATE OF CORRECTION

PATENT NO.    : 6,224,782 B1
DATED         : May 1, 2001
INVENTOR(S)   : Allewaert, Kathy It is certified that error appears in the above-identified patent and that said Letters Patent is hereby corrected as shown below:

<u>Title page,</u>
Item [87], delete PCT Pub. No.: "WO97/14842" and insert in place thereof
-- WO98/51725 --.
Delete PCT Pub. Date: "Apr. 24, 1997" and insert in place thereof -- Nov. 19, 1998 --.

<u>Column 6,</u>
Line 19, delete "$CF_3(CF_2)_6CH_{22}OCOCH=CH_2$" and insert in place thereof -- $CF_3(CF_2)_6(CH_2)_2OCOCH=CH_2$ --.

<u>Column 7,</u>
Line 1, delete "lycidyl" and insert in place thereof -- glycidyl --.

<u>Column 8,</u>
Line 8, delete "$H-W^1-R_6-(O-R_7)_i-(O-R^8)_j-W^2-H$" and insert in place thereof
-- $H-W^1-R^6-(O-R^7)_i-(O-R^8)_j-W^2-H$ --.
Line 25, delete "tenninated" and insert in place thereof -- terminated --.
Line 63, delete "DESMODLRT$^{TM}$" and insert in place thereof -- DESMODUR$^{TM}$ --.

<u>Column 10,</u>
Line 13, insert -- 5% -- following "to" and preceding "by".

<u>Column 12,</u>
Line 36, delete "70%/130%" and insert in place thereof -- 70%/30% --.

<u>Column 19,</u>
Line 52, insert -- be -- following "can" and preceding "improved".

<u>Column 20,</u>
Line 33, delete "Polvinyl$^{TM}$" and insert in place thereof -- Polyviol$^{TM}$ --.

<u>Column 21,</u>
Line 36, insert -- to -- following "alcohol" and preceding "the".

UNITED STATES PATENT AND TRADEMARK OFFICE
CERTIFICATE OF CORRECTION

PATENT NO.   : 6,224,782 B1
DATED        : May 1, 2001
INVENTOR(S)  : Allewaert, Kathy It is certified that error appears in the above-identified patent and that said Letters Patent is hereby corrected as shown below:

Column 22,
Line 14, delete "0.9" and insert in place thereof -- 6.9 --.
Line 65, delete "#0.8" and insert in place thereof -- 0.8 --.

Column 23,
Line 17, delete "either" and insert in place thereof -- ether --.

Column 26,
Line 43, delete "capable of reacting" and insert in place thereof -- reactive --.
Line 53, delete "16" and insert in place thereof -- 11 --.
Line 60, delete "8" and insert in place thereof -- 18 --.

Signed and Sealed this

Twenty-ninth Day of October, 2002

Attest:

Attesting Officer

JAMES E. ROGAN
*Director of the United States Patent and Trademark Office*